United States Patent
Honeyman et al.

(10) Patent No.: US 7,903,319 B2
(45) Date of Patent: Mar. 8, 2011

(54) ELECTROPHORETIC MEDIUM AND DISPLAY WITH IMPROVED IMAGE STABILITY

(75) Inventors: Charles Howie Honeyman, Roslindale, MA (US); Thomas H. Whitesides, Somerville, MA (US); Michael D. Walls, Dorchester, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 11/774,909

(22) Filed: Jul. 9, 2007

(65) Prior Publication Data

US 2008/0013155 A1 Jan. 17, 2008

Related U.S. Application Data

(60) Provisional application No. 60/806,987, filed on Jul. 11, 2006.

(51) Int. Cl.
G02B 26/00 (2006.01)
G02F 1/133 (2006.01)
G03G 13/00 (2006.01)

(52) U.S. Cl. ............................ 359/296; 349/33; 430/31

(58) Field of Classification Search .................. 359/245, 359/253–254, 265, 290–291, 296; 349/33; 345/107; 430/31–32
See application file for complete search history.

(56) References Cited

U.S. PATENT DOCUMENTS

| | | | |
|---|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |

(Continued)

FOREIGN PATENT DOCUMENTS

EP 1 099 207 B1 3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

Primary Examiner — Scott J Sugarman
Assistant Examiner — Dawayne A Pinkney
(74) Attorney, Agent, or Firm — David J. Cole

(57) ABSTRACT

An electrophoretic medium comprises a fluid and a plurality of electrically charged particles disposed in the fluid and capable of moving therethrough on application of an electrical field to the medium. Each of the charged particles has a polymer coating comprising a first group. A polymer is dispersed in the fluid, this polymer having a plurality of second groups capable of attracting the first groups on the particles so that the polymer in the fluid forms a complex with the electrophoretic particles.

13 Claims, No Drawings

U.S. PATENT DOCUMENTS

| | | |
|---|---|---|
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Morrison et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Pratt et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,598,173 B2 | 10/2009 | Ritenour et al. |
| 7,602,374 B2 | 10/2009 | Zehner et al. |
| 7,605,799 B2 | 10/2009 | Amundson et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0007336 A1 | 1/2005 | Albert et al. |
| 2005/0012980 A1 | 1/2005 | Wilcox et al. |
| 2005/0018273 A1* | 1/2005 | Honeyman et al. ........... 359/296 |
| 2005/0024353 A1 | 2/2005 | Amundson et al. |
| 2005/0062714 A1 | 3/2005 | Zehner et al. |
| 2005/0112205 A1* | 5/2005 | Moolman et al. ............. 424/487 |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |

| | | |
|---|---|---|
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0200795 A1 | 8/2007 | Whitesides et al. |
| 2007/0200874 A1 | 8/2007 | Amundson et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2007/0247697 A1 | 10/2007 | Sohn et al. |
| 2007/0286975 A1 | 12/2007 | Fazel et al. |
| 2008/0024482 A1 | 1/2008 | Gates et al. |
| 2008/0074730 A1 | 3/2008 | Cao et al. |
| 2008/0117495 A1 | 5/2008 | Arango et al. |
| 2008/0299859 A1 | 12/2008 | Paolini, Jr. et al. |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).
Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1 SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal TiO2 Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

* cited by examiner

US 7,903,319 B2

ELECTROPHORETIC MEDIUM AND DISPLAY WITH IMPROVED IMAGE STABILITY

REFERENCE TO RELATED APPLICATIONS

This application claims benefit of copending Application Ser. No. 60/806,987, filed Jul. 11, 2006.

This application is also related to:

(a) U.S. Pat. No. 6,822,782;
(b) application Ser. No. 11/673,269, filed Feb. 9, 2007 (Publication No. 2007/0128352, now U.S. Pat. No 7,411,720);
(c) U.S. Pat. No. 7,170,670; and
(d) U.S. Pat. No. 7,230,750.

The entire contents of these patents and copending applications, and of all other U.S. patents and published and copending applications mentioned below, are herein incorporated by reference.

BACKGROUND OF INVENTION

This invention relates to an electrophoretic medium with improved image stability, and to an electrophoretic display incorporating such an electrophoretic medium. More specifically, this invention relates to an electrophoretic medium and display which allow improved image stability without unacceptable increases in the switching time or the drive voltage of the display.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Particle-based electrophoretic displays have been the subject of intense research and development for a number of years. In this type of display, a plurality of charged particles move through a fluid under the influence of an electric field. Electrophoretic displays can have attributes of good brightness and contrast, wide viewing angles, state bistability, and low power consumption when compared with liquid crystal displays. In such electrophoretic displays, an optical property is changed by application of the electric field; this optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; and 7,236,792; and U.S. Patent Applications Publication Nos. 2002/0060321; 2002/0090980; 2003/0011560; 2003/0102858; 2003/0151702; 2003/0222315; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0213191; 2005/0219184; 2005/0253777; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0202949; 2006/0223282; 2006/0232531; 2006/0245038; 2006/0256425; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0097489; 2007/0109219; 2007/0128352; and 2007/0146310; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see US Patent Publication No. 2004/0226820); and other similar techniques.) Thus, the resulting display can be flexible. Further, because the display medium can be printed (using a variety of methods), the display itself can be made inexpensively.

As already noted, problems with the long-term image quality of conventional unencapsulated electrophoretic displays have hindered their widespread usage. For example, the electrophoretic particles tend to settle out of the fluid, resulting in inadequate service-life for these displays. Encapsulation of the electrophoretic internal phase (the electrophoretic particles and the surrounding fluid) avoids problems caused by large scale movement of the electrophoretic particles, since the electrophoretic particles can move only within the confines of an individual capsule, droplet or microcell. However, even in encapsulated electrophoretic displays, the stability of images written on the display is a matter of continuing concern. Although as already mentioned such displays do exhibit bistability, this bistability is not unlimited, and images on the display slowly fade with time. In the absence of an electric field, the electrophoretic particles of an encapsulated display tend to settle or slump under the influence of gravity, leading to objectionable changes in the optical state. Even where the density of the electrophoretic particles is similar to that of the surrounding fluid (and it is often difficult to find combinations of particles and fluids having similar densities and meeting all the other requirements required in electrophoretic displays), Brownian motion of the electrophoretic particles, and, in the case of electrophoretic media containing electrophoretic particle bearing charges of both polarities, electrostatic forces between oppositely-charged particles, can lead to degradation of an optical state, typically manifested as a gradual loss of contrast. Although the electrophoretic particles can only move within the confines of a single capsule, droplet or microcell, intermixing of two or more types of particles (in the case of electrophoretic media containing multiple types of particles) or movement of particle relative to a colored fluid (in electrophoretic media containing particles and such a colored fluid) can gradually degrade an image written on the display.

Several approaches have been suggested to reduce the aforementioned image-degrading effects, and thus to increase the bistability of an electrophoretic display. For example, it has been suggested that the particles and the walls of the surrounding capsule or microcell be chosen so that the particles are attracted to the walls. Such attraction can be electrostatic (when the electrochemical potentials of the surfaces of the particle and the wall are dissimilar), chemical, or dispersive (i.e., result from van der Waals forces) in nature. However such particle-wall forces typically stabilize only one layer of particles, which may be adequate if the particles are light absorbing (e.g., black), but will not be adequate for light scattering (e.g., white particles), where several layers of particles are necessary for adequate optical performance.

Another approach is to choose the electrophoretic particles and the fluid so that there is a weak attractive force between similar particles, i.e., so these particles are weakly flocculated when similar particles are aggregated together after writing an image on the display. This weak attractive force can be achieved in several different ways. For example, the aforementioned U.S. Pat. No. 7,170,670 describes an electrophoretic medium in which weak flocculation of particles is achieved by the addition to the fluid of a high molecular weight polymer, such as polyisobutylene, that is believed to cause depletion flocculation of the electrophoretic particles. Although this approach can give substantial improvements in bistability, the addition of the polymer to the fluid inevitably increases the viscosity of the fluid, and hence increases the switching time of the display, since the increased viscosity of the fluid reduces the rate of movement of the electrophoretic particles at any given electric field.

Accordingly, it is desirable to adopt an approach to increasing image bistability which can achieve electrophoretic particle flocculation without significant increase in the viscosity of the fluid. One such approach, described in the aforementioned U.S. Pat. No. 7,230,750, involves modification of the polymer shell which is advantageously present around electrophoretic particles (see the aforementioned U.S. Pat. No. 6,822,782) to promote inter-particle attraction. This modification comprises incorporation into the polymer shell of repeating units derived from a monomer the homopolymer of which is incompatible with the fluid, so that the added monomer tends to make the polymer shell less solvated by the fluid, and hence promote self-aggregation of similar electrophoretic particles. The aforementioned U.S. Pat. No. 7,230,750 shows that electrophoretic displays incorporating particles having such modified polymer shells possess improved image stability, and may have a threshold for switching, i.e., the medium does not change optical state until the applied electric field exceeds a certain threshold value.

U.S. Patent Application Publication No. 2004/0131959 describes a method for inducing or enhancing the threshold voltage of an electrophoretic display using a fluorinated fluid containing a "threshold promoter" comprising a halogenated group or a halogenated polymeric or oligomeric chain attached to one or more functional groups capable of hydrogen bonding, acid-base interaction, donor-acceptor interaction, metal-ligand interaction or Coulombic interaction. It appears from Paragraph 81 of this Publication that the function of the threshold promoter is to increase interaction between an electrode protecting layer of the display and the electrophoretic particles.

It has now been found that the bistability of an electrophoretic medium comprising polymer-coated electrophoretic particles dispersed in a fluid can be improved by providing appropriate groups in the polymer coating, and dispersing in the fluid a polymer having groups which can weakly interact with the groups in the polymer coating.

SUMMARY OF INVENTION

Accordingly, this invention provides an electrophoretic medium comprising a fluid and a plurality of electrically charged particles disposed in the fluid and capable of moving therethrough on application of an electrical field to the medium, each of the charged particles having a polymer coating comprising at least one first group, the medium further comprising a polymer dispersed in the fluid, the polymer in the fluid having a plurality of second groups capable of attracting the first groups on the particles so that the polymer in the fluid forms a complex with the electrophoretic particles.

In the electrophoretic medium of the present invention, the polymer in the fluid may have a molecular weight not greater than about 200 kD, preferably not greater than about 100 kD. One of the polymer coating and the polymer in the fluid may comprise a hydrogen bond donor and the other comprise a hydrogen bond acceptor. Alternatively, both the polymer coating and the polymer in the fluid may comprise a monomer which is incompatible with the fluid. The polymer in the fluid may comprise a tri-block copolymer and the polymer coating comprise a group that associates with the terminal blocks of the tri-block copolymer. For example, the polymer in the fluid may comprise a poly(styrene)-block-(poly(ethylene-propylene)-block-poly(styrene)copolymer and the polymer coating comprise terminal polystyrene segments. The polymer in the fluid may comprise a nitrogenous heterocyclic group and the polymer in the fluid comprise an amino ester.

The electrophoretic medium of the present invention may be of any of the types known in the art. The electrophoretic medium may not be encapsulated, or the electrically charged particles and the fluid may be confined within a plurality of capsules or microcells. Alternatively, the electrophoretic medium may be of the polymer-dispersed type, with the electrically charged particles and the fluid present as a plurality of discrete droplets surrounded by a continuous phase comprising a polymeric material. The electrophoretic medium may comprise only a single type of electrically charged particle, two (or more) different types of electrically charged particles bearing charges of the same polarity, or two different types of electrically charged particles bearing charges of opposing polarity. The electrically charged particles may comprise at least one of titania, carbon black and copper chromite.

This invention extends to an electrophoretic display comprising an electrophoretic medium of the invention and at least one electrode arranged to apply an electric field to the medium.

The displays of the present invention may be used in any application in which prior art electrophoretic displays have been used. Thus, for example, the present displays may be used in electronic book readers, portable computers, tablet computers, cellular telephones, smart cards, signs, watches, shelf labels and flash drives.

DETAILED DESCRIPTION

As indicated above, the present invention provides an electrophoretic medium having electrophoretic particles provided with a polymer coating. A polymer is dispersed in the fluid surrounding the electrophoretic particles, and the polymer coating on the particles and the polymer in the fluid (hereinafter the "fluid polymer") are provided with groups which attract each other so that the polymer forms a complex with the electrophoretic particles. The fluid polymer bears a plurality of such groups so that it can complex with two or more electrophoretic particles; in effect, the polymer acts as a "chemical bridge" between particles, and this chemical bridge resists relative movement between particles so that, for example, when a group of similar particles are aggregated by application of an electric field to the electrophoretic medium so as to drive particles having similar charges adjacent an electrode, the chemical bridges which form between the aggregated particles will resist any tendency for individual particles to leave the aggregate, thus increasing the bistability of the optical state exhibited by the aggregated particles. It is believed (although this invention is in no way limited by this belief) that the chemical bridges may also introduce a voltage threshold for electrophoretic particle movement (i.e., may ensure that the particles do not move at all unless the applied voltage exceeds a minimum value) thus avoiding changes in the optical state of the display caused by unwanted small voltages to which in practice electrophoretic displays are inevitably exposed, for example as a result of parasitic capacitances in backplanes used to drive such displays.

Although the present electrophoretic medium resembles that described in the aforementioned U.S. Pat. No. 7,170,670 in requiring the presence of a polymer in the fluid, the mode of action of the fluid polymer used in the present medium is very different from that of the polymer in this patent. In U.S. Pat. No. 7,170,670, the polymer is not substantially adsorbed on to the electrophoretic particles, and needs to be of high molecular weight since it acts by a depletion flocculation mechanism. To act in this way, a substantial amount of the high molecular weight polymer is required, typically around 1 to 2 per cent by weight of the fluid. The presence of this amount of polymer substantially increases the viscosity of the fluid, and hence the switching time of the display. In contrast, in the electrophoretic medium of the present invention, the fluid polymer can be of relatively low molecular weight (typically less than 200 kD, and, as illustrated in the Examples below, as low as 60 kD), and can be used effectively at low concentration. This is because the interactions between the groups on the fluid polymer and on the polymer coating of the electrophoretic particles form bridges between particles, thus forming a floc of particles. Hence, the presence of the fluid polymer does not significantly increase the viscosity of the fluid, and has a correspondingly minimal effect on the switching time of the medium.

As will readily be apparent to those skilled in the technology of electrophoretic media, to secure optimum results in the electrophoretic medium of the present invention, it is important to control the strength of the interactions between the fluid polymer and the polymer coating of the electrophoretic particles. The strength of these interactions can be controlled by adjusting, inter alia, the molecular weight, structure and concentration of the fluid polymer, the length of the polymer in the particle coating, and its structure. In one preferred embodiment of the invention, one of the first and second groups is a hydrogen bond donor, and the other is a hydrogen bond acceptor. Another approach is to incorporate into both polymers monomers the homopolymers of which are incompatible with the fluid, as described in the aforementioned U.S. Pat. No. 7,002,728 for the particle polymer coating alone. A third approach is to use tri-block copolymers in the fluid together with a particle polymer coating modified to contain a group that associates with the terminal blocks of the tri-block copolymer. The associating groups in this type of system are conveniently aromatic groups. An example of this approach would be to use a poly(styrene)-block-(poly(ethylene-propylene)-block-poly(styrene)copolymer in the fluid, and electrophoretic particles the polymer coatings of which have terminal polystyrene segments. Such electrophoretic particles could, for example, have a lauryl methacrylate (LMA) coating, with polystyrene chains grafted in a second polymerization step, either by using residual surface groups or by atom-transfer radical polymerization from the LMA chain, into which a small amount of chloromethyl styrene has been incorporated by copolymerization in the first step.

EXAMPLE

Experimental single pixel displays using an electrophoretic medium comprising copper chromite and titania in a hydrocarbon fluid were prepared substantially as described in Example 7 of the aforementioned U.S. Pat. No. 7,002,728, except that the copper chromite particles were provided with a polymer coating formed from a 95:5 mole per cent mixture of lauryl methacrylate and 4-vinylpyridine using radical polymerization with AIBN as the initiator and toluene as the solvent. Control displays were also prepared in which the coating on the copper chromite was prepared using lauryl methacrylate alone. The titania particles were R794 titania (available commercially from E. I. du Pont de Nemours & Company, Wilmington Del.) coated with a lauryl methacrylate coating as described in the aforementioned U.S. Pat. No. 7,002,728. The fluid of the internal phase was Isopar G with the addition of varying amounts (as indicated below) of a copolymer of lauryl methacrylate and dimethylaminoethyl methacrylate prepared by radical polymerization and having a weight average molecular weight ($M_w$) of 62 kD. The lamination adhesive used was a custom polyurethane as described in U.S. Patent Application Publication No. 2005/0124751, doped with 180 ppm of tetrabutylammonium hexafluorophosphate (cf. the aforementioned U.S. Pat. No. 7,173,752).

The single pixel displays were driven between their extreme black and white optical states using 10 V, 250 millisecond drive pulses. Each display was first repeatedly cycled between its two extreme optical states to remove any effects due to the past history of the display, then driven to one extreme optical state, and the reflectivity of this optical state measured 3 seconds and 2 minutes after the end of the drive pulse (the 3 second wait after the drive pulse is to allow certain very short term effects which occur at the end of the drive pulse to dissipate). The reflectivities thus measured were converted to L* values (where L* has the usual CIE definition:

$$L^* = 116(R/R_0)^{1/3} - 16,$$

where R is the reflectance and $R_0$ is a standard reflectance value), and the difference between the two L* values recorded as the "2 minute image stability". This 2 minute image stability was measured separately for the black and white extreme optical states. Also measured was the dynamic range (D.R.), measured as the difference between the black and white L* values 3 seconds after the end of the drive pulse.

The results of these tests are shown in Table 1 below. In this Table, in the column headed "Coating", "vp5" indicates that the polymer coating on the copper chromite contained 4-vinylpyridine; the other displays were controls using a poly(lauryl methacrylate) coating on the copper chromite.

TABLE 1

| Display | Coating* | Fluid polymer, % | D.R. dL* | 2 minute Image Stability (dL*) White State | Dark State |
|---|---|---|---|---|---|
| A |  | 0 (Control) | 53.7 | −3.4 | 8.2 |
| B | vp5 | 0 (Control) | 54.9 | −2.7 | 9.2 |
| C |  | 0.9 (Control) | 54.9 | −2.8 | 7.9 |
| D | vp5 | 0.9 | 52.1 | −3.6 | 3.6 |

From the data in Table 1, it will be seen that neither the dynamic range nor the white state image stability was strongly affected by inclusion of the fluid polymer or by inclusion of 4-vinylpyridine in the polymer coating of the black particles; the lack of change in white image stability is not surprising since in all the displays tested the coating on the white particles was simple poly(lauryl methacrylate) which contained no groups capable of interacting with the fluid polymer. Similarly, incorporation of the 4-vinylpyridine into the polymer shell of the black particles without the inclusion of any fluid polymer (Display B) did not significantly affect dark state image stability. However, when both the 4-vinylpyridine in the polymer coating of the black particles and the fluid polymer were present (Display D), there was a very pronounced drop in dark state image drift, from 8.2 to 3.6 L* units.

A further series of experiments were conducted using varying amounts of fluid polymer, and the results are reported in Table 2 below. In these experiments, all the polymer coatings on the black pigment contained 4-vinylpyridine.

TABLE 2

| Display | Coating* | Fluid polymer, % | D.R. dL* | 2 minute Image Stability (dL*) White State | Dark State |
|---|---|---|---|---|---|
| E | vp5 | 0 (Control) | 54.9 | −2.7 | 7.9 |
| F | vp5 | 0.5 | 50.3 | −2.7 | 8.2 |
| G | vp5 | 0.9 | 52.1 | −2.9 | 7.0 |
| H | vp5 | 2 | 51.7 | −1.2 | 4.8 |
| I | vp5 | 4 | 47.6 | −1.3 | 3.6 |

The data in Table 2 show that the proportion of polymer in the fluid influences dark state image stability, and that substantial improvements in such dark state stability can be obtained without major changes in the electro-optic properties of the display.

From the foregoing, it will be seen that the present invention provides an electrophoretic medium having improved image stability without comprising the switching time of the medium or the other electro-optic properties thereof. The present invention also provides numerous ways for fine tuning of the image stability of the electrophoretic medium to allow for changes in other parameters of the medium.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic medium comprising a fluid and a plurality of electrically charged particles disposed in the fluid and capable of moving therethrough on application of an electrical field to the medium, each of the charged particles having a polymer coating comprising at least one first group, the medium further comprising a polymer dispersed in the fluid, the polymer in the fluid having a plurality of second groups capable of attracting the first groups on the particles so that the polymer in the fluid forms a complex with the electrophoretic particles, wherein one of the polymer coating and the polymer in the fluid comprises a hydrogen bond donor and the other comprises a hydrogen bond acceptor.

2. An electrophoretic medium according to claim 1 wherein the polymer in the fluid has a molecular weight not greater than about 200 kD.

3. An electrophoretic medium according to claim 2 wherein the polymer in the fluid has a molecular weight not greater than about 100 kD.

4. An electrophoretic medium according to claim 1 wherein both the polymer coating and the polymer in the fluid comprise a monomer which is incompatible with the fluid.

5. An electrophoretic medium according to claim 1 wherein the polymer in the fluid comprises a tri-block copolymer and the polymer coating comprises a group that associates with the terminal blocks of the tri-block copolymer.

6. An electrophoretic medium according to claim 5 wherein the polymer in the fluid comprises a poly(styrene)-block-(poly(ethylene-propylene)-block-poly(styrene) copolymer and the polymer coating comprises terminal polystyrene segments.

7. An electrophoretic medium according to claim 1 wherein the polymer in the fluid comprises a nitrogenous heterocyclic group and the polymer in the fluid comprises an amino ester.

8. An electrophoretic medium according to claim 1 wherein the electrically charged particles and the fluid are confined within a plurality of capsules or microcells.

9. An electrophoretic medium according to claim 1 wherein the electrically charged particles and the fluid are present as a plurality of discrete droplets surrounded by a continuous phase comprising a polymeric material.

10. An electrophoretic medium according to claim 1 comprising two different types of electrically charged particles bearing charges of opposing polarity.

11. An electrophoretic medium according to claim 1 wherein the electrically charged particles comprise at least one of titania, carbon black and copper chromite.

12. An electrophoretic display comprising an electrophoretic medium according to claim 1 and at least one electrode arranged to apply an electric field to the electrophoretic medium.

13. An electronic book reader, portable computer, tablet computer, cellular telephone, smart card, sign, watch, shelf label or flash drive comprising a display according to claim 12.

* * * * *